United States Patent
McCormick et al.

(10) Patent No.: US 11,606,285 B2
(45) Date of Patent: Mar. 14, 2023

(54) METHOD AND APPARATUS FOR CONFIGURING A COMMUNICATION NETWORK USING A DISTANCE METRIC

(71) Applicant: HUAWEI TECHNOLOGIES CO., LTD., Shenzhen (CN)

(72) Inventors: William Carson McCormick, Ottawa (CA); Francis Patrick Kelly, Cambridge (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/314,940

(22) Filed: May 7, 2021

(65) Prior Publication Data
US 2022/0360518 A1   Nov. 10, 2022

(51) Int. Cl.
*H04L 45/122* (2022.01)
*H04B 7/185* (2006.01)
*H04L 45/28* (2022.01)
*H04L 45/00* (2022.01)

(52) U.S. Cl.
CPC ....... *H04L 45/122* (2013.01); *H04B 7/18519* (2013.01); *H04L 45/22* (2013.01); *H04L 45/28* (2013.01)

(58) Field of Classification Search
CPC ....... H04L 45/122; H04L 45/22; H04L 45/28; H04B 7/00; H04B 7/06; H04B 7/18519
See application file for complete search history.

(56) References Cited

U.S. PATENT DOCUMENTS

| 4,912,656 | A | 3/1990 | Cain et al. |
| 5,920,804 | A * | 7/1999 | Armbruster ........ H04B 7/18584 455/430 |
| 8,699,329 | B2 * | 4/2014 | Chiabaut ................. H04L 45/22 370/229 |
| 8,948,053 | B2 | 2/2015 | Kolavennu |
| 2006/0268749 | A1 | 11/2006 | Rahman et al. |
| 2008/0155070 | A1 | 6/2008 | El-Damhougy et al. |
| 2010/0140413 | A1 * | 6/2010 | Bailey ................. B64G 1/1021 701/13 |
| 2015/0103642 | A1 | 4/2015 | Stuart |
| 2015/0334007 | A1 | 11/2015 | Miyoshi |

(Continued)

FOREIGN PATENT DOCUMENTS

| CN | 105009515 A | 10/2015 |
| CN | 107787023 A | 3/2018 |

(Continued)

*Primary Examiner* — Mohamed A Kamara

(57) ABSTRACT

A method and apparatus for configuring a communication network based on a distance metric. Information indicative of current status of communication network nodes, links between the nodes, or a combination thereof is obtained and processed to determine a network configuration. The network configuration is implementable in the communication network by adjusting one or more nodes or links. The processing includes evaluating network configurations based on a distance metric, which is indicative of lengths of shortest paths which interconnect nodes of the network. Instructions directing underlying resources to implement the network configuration can be provided. An apparatus can be a supervisory device including a network interface and a computer processor.

20 Claims, 10 Drawing Sheets

300

302 Obtain information indicative of current status of nodes of the communication network, links between said nodes of the communication network or a combination thereof.

304 Process the information to determine a network configuration based on the obtained information, the network configuration implementable in the communication network by adjusting one or more of said nodes, one or more of said links between network nodes, or a combination thereof.

Processing includes evaluating at least the network configuration based on a distance metric indicative of the lengths of shortest paths which interconnect said nodes of the network via said links.

306 Provide instructions directing one or more underlying resources to implement the network configuration.

(56) References Cited

U.S. PATENT DOCUMENTS

| | | |
|---|---|---|
| 2016/0198152 A1 | 7/2016 | Chin et al. |
| 2018/0098247 A1* | 4/2018 | Gopal .................... H04L 45/28 |
| 2018/0220352 A1 | 8/2018 | Hudson et al. |
| 2018/0302807 A1 | 10/2018 | Chen et al. |
| 2020/0177495 A1* | 6/2020 | Inoue .................... H04L 47/122 |
| 2022/0094431 A1 | 3/2022 | Kaen et al. |

FOREIGN PATENT DOCUMENTS

| | | | | |
|---|---|---|---|---|
| CN | 111953399 A | | 11/2020 | |
| CN | 112235034 A | | 1/2021 | |
| CN | 112311441 A | | 2/2021 | |
| CN | 112702107 A | * | 4/2021 | ........... H04B 7/1856 |
| EP | 2869087 A1 | | 5/2015 | |
| ES | 2874538 T3 | | 11/2021 | |
| WO | 2012062386 A1 | | 5/2012 | |

\* cited by examiner

300 ↘

302 Obtain information indicative of current status of nodes of the communication network, links between said nodes of the communication network or a combination thereof.

↓

304 Process the information to determine a network configuration based on the obtained information, the network configuration implementable in the communication network by adjusting one or more of said nodes, one or more of said links between network nodes, or a combination thereof.

Processing includes evaluating at least the network configuration based on a distance metric indicative of the lengths of shortest paths which interconnect said nodes of the network via said links.

↓

306 Provide instructions directing one or more underlying resources to implement the network configuration.

FIG. 3

METHOD AND APPARATUS FOR CONFIGURING A COMMUNICATION NETWORK USING A DISTANCE METRIC

CROSS-REFERENCE TO RELATED APPLICATIONS

This is the first application filed for this invention.

FIELD OF THE INVENTION

The present invention pertains in general to communication networks, such as satellite networks, and in particular to a method and apparatus for configuring (e.g. initially configuring or reconfiguring) a communication network, for example by configuring nodes thereof.

BACKGROUND

Terrestrial networks are designed and deployed based on geographic locations. In such terrestrial networks, routers are often installed based on user demand and optical connections are installed to accommodate load and the routers' shortest path behavior. Equipment failures are repaired quickly by maintenance personnel who can access the equipment at the site.

In contrast, in a satellite network, network nodes (e.g. routers) will likely be deployed in a regular geometric mesh in Earth orbit. Orbital locations will likely be precisely defined in order to enable inter-satellite links.

Failures in a satellite network are expected to be difficult to repair. A satellite-based failed piece of equipment would have to be captured for repair. Alternatively, the satellite could be left in orbit until it no longer provides any service. At this point, the satellite could be de-orbited and a replacement satellite launched.

The above methods of dealing with partial or full failures of satellite network nodes are expensive and problematic. Therefore there is a need to provide a method and apparatus that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method, apparatus and system for configuring (e.g. initially configuring or reconfiguring) a communication network, for example by configuring or reconfiguring nodes thereof. The configuring is based at least in part on a distance metric which is indicative of the lengths of shortest paths (which may be multi-hop paths) which interconnect nodes of the network via links. The distance metric can be based on the result of a shortest path computation which represents the interconnections between nodes of the network. In particular, a network configuration is selected, from among a plurality of potential configurations, based on the distance metric applied to that network configuration, and obtained available information about the network. The selected network configuration is then implemented.

Embodiments of the present invention provide for a method and apparatus for reconfiguring a network, such as a satellite network, for example following failure events. This allows network operators to achieve an improved use of network resources throughout the operational life of such resources. Embodiments of the present invention can be applied to networks including satellites in low earth orbit or another type of orbit. Embodiments of the present invention can be more generally applied to any network with a regular structure, for example, of node locations.

In order to effectively reconfigure the network, there is provided a means to evaluate the network configuration. Embodiments of the present invention use "distance metrics" to evaluate the network configuration. This allows the network to be reconfigured from a state corresponding to a poor distance metric, to a state corresponding to a better distance metric, after a failure event occurs. A distance metric generally provides a numerical value, or set of values, which reflect the lengths of shortest communication paths between pairs of nodes. For example, networks having nodes which, on average are connected via longer shortest paths may be considered to have a higher corresponding distance metric (e.g. diameter) than networks having nodes which, on average, are connective via shorter shortest paths. Several particular distance metrics are described herein.

Embodiments of the present invention combine particular distance metrics with one or more search methods for determining network configurations, the search methods using the distance metrics. Embodiments of the present invention are applied in the context of a satellite operations, administration and maintenance (OAM) system.

According to embodiments of the present invention, there is provided a method for configuring a communication network. The method includes obtaining information indicative of current status of nodes of the communication network, links between the nodes of the communication network or a combination thereof. The method further includes processing the information to determine a network configuration based on the obtained information. The network configuration is implementable in the communication network by adjusting one or more of the nodes, one of more of the links between the nodes, or a combination thereof. The processing includes evaluating at least the network configuration based on a distance metric indicative of the lengths of shortest paths which interconnect nodes of the network via the links. The method further includes providing instructions directing one or more underlying resources to implement the network configuration.

In some embodiments the network is a satellite network. In some embodiments the satellite network includes a low-earth orbit (LEO) satellite constellation, a plurality of LEO satellite constellations, a hybrid satellite constellation comprising LEO satellites and medium earth orbit (MEO) satellites, or a hybrid satellite constellation comprising LEO satellites and geostationary earth orbit (GEO) satellites.

In some embodiments the current status is indicative of whether or not one or more of the nodes or one or more of the links is in an outage state.

In some embodiments processing the information to determine the network configuration includes evaluating one or more candidate network configurations based on the distance metric, and selecting the network configuration as one of the candidate network configurations having a lowest, or at least a sufficiently low value for the distance metric (assuming a lower value of the distance metric reflects shorter shortest path characteristics of the network).

In some embodiments, the processing includes evaluating a plurality of candidate network configurations, including the at least one network configuration, to determine a value of the distance metric for each respective one of the candidate network configurations. The processing then includes selecting the network configuration from among the candidate network configurations based at least in part on a comparison between the determined values of the distance metric. Selecting the network configuration can include one of: selecting, as the network configuration, one of the candidate network configurations having a lowest value of the distance metric; selecting, as the network configuration, one of the candidate network configurations having a lowest value of the distance metric and satisfying one or more other predetermined conditions; and selecting, as the network configuration, one of the candidate network configurations having one of the lowest values of the distance metric.

In some embodiments the distance metric is based at least in part on a result of a shortest path computation. The result is indicative of one of the candidate configurations. Evaluating the one of the candidate configurations includes computing the result. In some embodiments the shortest path computation is computed based on a shortest path algorithm. In some embodiments the shortest path algorithm is at least one of a Dijkstra's shortest path algorithm, a Bellman-Ford algorithm, or a Floyd-Warshall algorithm. In some embodiments the shortest path computation is computed using an optimization program.

In some embodiments, the distance metric is indicative of one or more of: a longest one of the shortest paths; a shortest one of the shortest paths; an average length of some or all of the shortest paths; and one or more indications of a statistical distribution of the shortest paths. In some embodiments the distance metric indicates one or more of: a network diameter, a maximum shortest path length, a minimum shortest path length, an average shortest path length, and all-pairs shortest path lengths.

In some embodiments processing the information to determine the network configuration includes evaluating a plurality of candidate network configurations based on the distance metric using a tree search, and selecting the network configuration as one of the candidate network configurations evaluated using the tree search and having at least a sufficiently low value for the distance metric. The tree search is performed on a tree having a root node, a plurality of branch nodes and a plurality of leaf nodes, each branch node and leaf node representing one of the candidate network configurations, and adjacent pairs of the branch nodes and leaf nodes representing candidate network configuration which differ by an incremental amount. In some embodiments the tree search is a depth-first tree search.

In some embodiments processing the information to determine the network configuration includes training a machine learning agent to select, from among candidate network configuration, a network configuration having an adequately low value for the distance metric, the training including providing feedback to the machine learning agent. The feedback is based at least in part on the distance metric. Processing the information further includes operating the machine learning agent to select the network configuration based on the information indicative of the current status of nodes of the communication network, the links between the nodes of the communication network, or the combination thereof. In some embodiments the machine learning agent uses a neural network to evaluate a state action value function indicative of the feedback to the machine learning agent.

In some embodiments the network configuration includes configuring one or more nodes.

In some embodiments the network configuration includes physically reorienting one or more of the nodes to reorient one of more directional transceivers thereof, the reorienting of directional transceivers affecting one or more of the links between the nodes.

According to embodiments of the present invention, there is provided a device, such as an electronic computing device which may be deployed on ground or alternatively aboard a satellite. The device includes a network interface, a processor, and a non-transient computer readable memory having stored instructions which when executed by the processor configure the device to execute the methods disclosed herein. In various embodiments, such a device is configured to obtain information indicative of current status of nodes of the communication network, links between the nodes of the communication network or a combination thereof. The device is further configured to process the information to determine a network configuration based on the obtained information. The network configuration is implementable in the communication network by adjusting one or more of the nodes, one or more of the links between the nodes, or a combination thereof. The processing comprises evaluating at least the network configuration based on a distance metric. The distance metric is indicative of the lengths of shortest paths which interconnect the nodes of the network via the links. The device is further configured to provide instruction directing one or more underlying resources to implement the network configuration.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 3 illustrates operations for configuring a communication network, according to an embodiment of the present invention.

It will be noted that throughout the appended drawings, like features are identified by like reference numerals.

DETAILED DESCRIPTION

As used herein, the term "about" should be read as including variation from the nominal value, for example, a +/−10% variation from the nominal value. It is to be understood that such a variation is always included in a given value provided herein, whether or not it is specifically referred to.

A satellite is likely to have different failure modes. The term "link equipment" is used herein to designate the equipment needed to operate an inter-satellite link in each satellite. Each piece of link equipment on a satellite may be designed as an independent module, so that the satellite can continue functioning after one or more link equipment failures. In this case, pieces of link equipment can potentially be repurposed as desired to support different communication links involving the satellite. Link equipment can similarly be used in other times of network devices which potentially for multiple communication links with other devices. A satellite can include multiple instances of link equipment, in order to concurrently support different links. Link equipment can be configured to implement a directional communication link, such as an optical or radio link.

Figure 1:
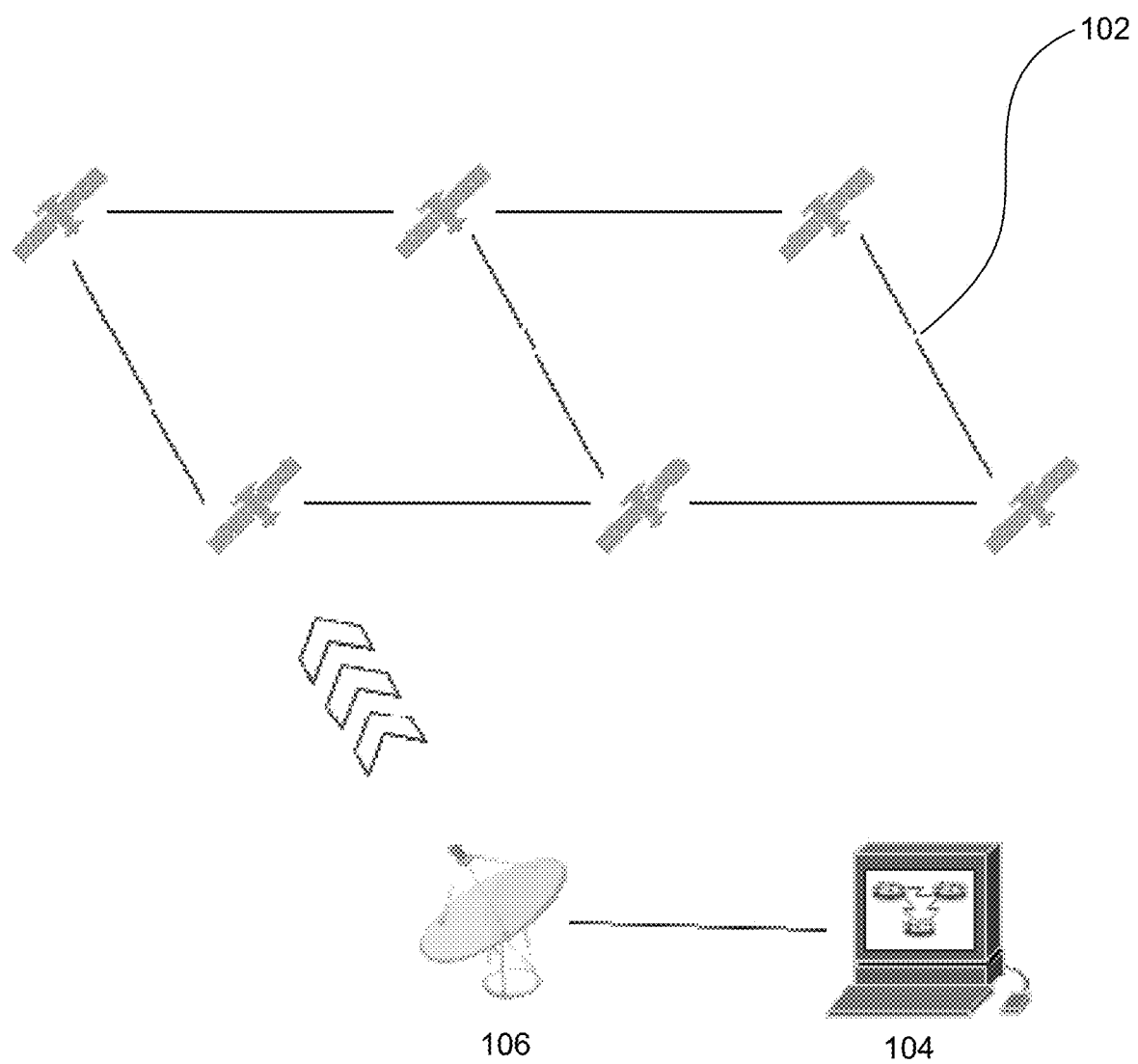
FIG. 1 illustrates an example system including satellites and a device for configuring same, according to an embodiment of the present invention.

FIG. 1 illustrates an example system involving a satellite network 102 and an apparatus for configuring same. The satellite network 102 is managed by a centralized OAM (operations, administration and maintenance) system 104. The OAM system 102 may communicate with the satellite network 102 through a ground station 106. When failures occur in the satellite network, they are reported back to the OAM system 104. The OAM system 104 determines a reconfiguration of the satellite network in view of such failures, and implements the reconfiguration, for example by transmitting instructions, to other devices such as satellite devices, for implementing the reconfiguration.

Figure 2A:
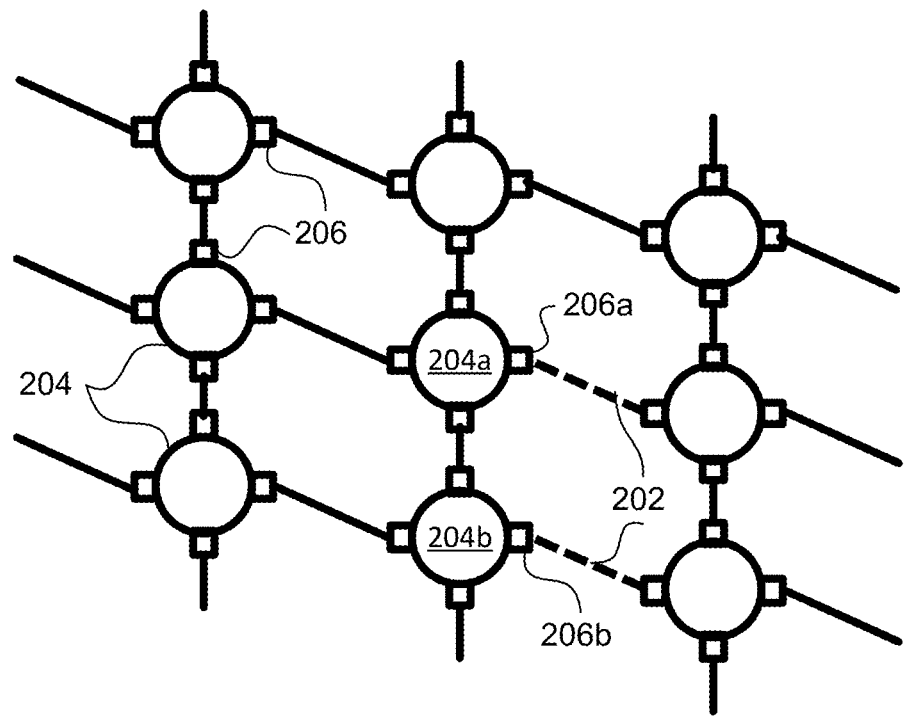
FIGS. 2A and 2B illustrate network nodes located in a geometric mesh, and reconfiguration of the network nodes in view of a failure, according to an embodiment of the present invention.
Figure 2B:
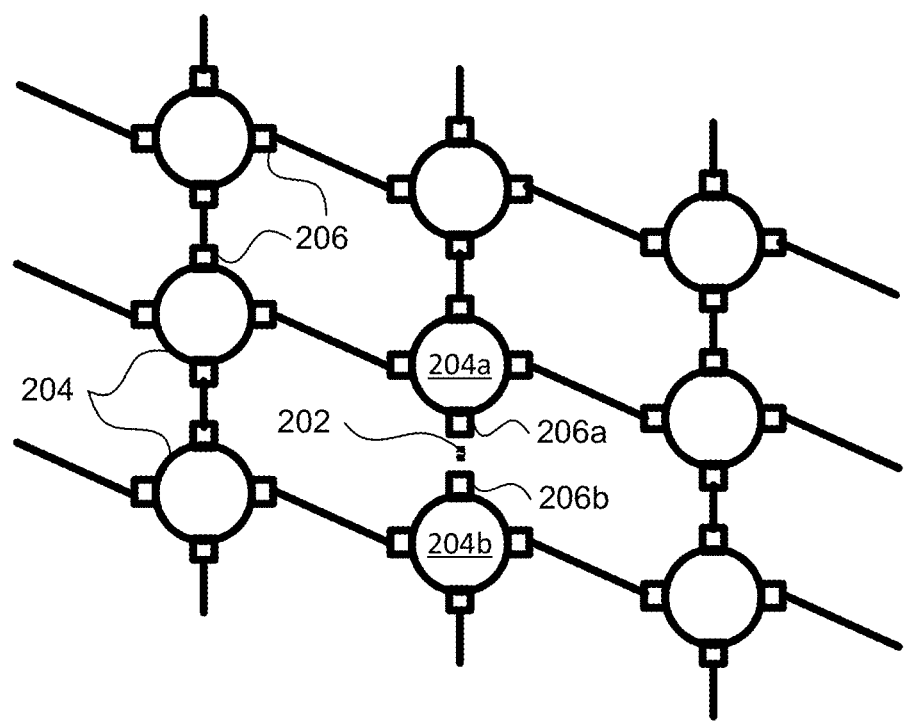

FIGS. 2A and 2B depict network nodes arranged in a geometrically regular mesh configuration. Such a configuration is anticipated in satellite networks, as the satellites' orbital positions in a constellation typically must be precisely defined. As noted above, hard failures are difficult and expensive to repair in a satellite network, for example from an orbital platform. For example, a problematic satellite would need to be captured and possibly returned to the ground for corrective action. It is also likely that the satellite would need to be replaced. Due to the cost and time required for such maintenance, it is probable that hard failures would accumulate in the network and satellite nodes thereof until action is required.

As an alternative, and in accordance with some embodiments of the present invention, satellite resources can be repurposed improve the network performance in situ. This may be accomplished by repurposing connections such as inter-satellite links (ISLs). In FIGS. 2A and 2B, the dashed lines 202 represent ISLs that have been repurposed in order to improve the overall network performance. In more detail, each satellite, represented by a circle 204 has four instances of link equipment (such as directional transceivers), represented by smaller squares 206. In FIG. 2A, the links 202 have failed because of failures of the link equipment instances 206a and 206b. In order to repurpose the satellite resources (link equipment) the two satellite nodes 204a and 204b, holding the failed link equipment instances 206a and 206b, respectively, are physically reoriented (e.g. rotated) so that the failed link equipment instances align, as shown in FIG. 2B. The number of broken links is reduced from two to one, thereby improving network connectivity and potentially improving shortest path distance between one or more pairs of nodes.

In some embodiments configuring the network includes physically reorienting one, some or all network nodes, in order to reorient one of more directional transceivers thereof, for example as shown in FIG. 2B. The reorienting of directional transceivers affects one or more of the links between nodes. Therefore, in various embodiments configuring the entire network includes configuring one or more of the individual nodes.

Accordingly, in view of FIGS. 2A and 2B, satellite nodes can be physically reoriented in order to reorient one or more link equipment instances (directional transceivers). This reorienting affects one or more links between nodes.

As used herein, a network configuration, such as a candidate network configuration, is discussed and processed (e.g. evaluated) according to a graph theoretic paradigm. In graph theoretic terms, the network is numerically represented as a graph G, where the network nodes are represented as graph vertices and the communication links between network nodes are represented as graph edges connecting pairs of vertices. Furthermore, some or all of the graph edges may be associated with weights. The weight for a given graph edge is a value representative of one or more physical or operational characteristics of the communication link represented by that edge. In some embodiments, specific weights are not necessarily specified, in which case a default weight (e.g. equal to one) may be assumed.

A weight associated with an edge can reflect one or a combination of arbitrary or actual properties of the communication link represented by that edge. Such properties can include, but are not necessarily limited to: status (failed or not-failed) of the link at a given time; physical distance between linked nodes; physical length of the link; resources (e.g. energy or computing power) required to operate the link; cost required to operate the link; time delay of the link; current availability of the link; number of internal communication hops or relaying operations of the link, etc. In various embodiments, the weight associated with an edge is indicative of a cost of using a communication link represented by that edge. The cost can be based on properties as indicated above. The cost can be a decreasing function of desirability of using that link.

In order to effectively reconfigure the satellite network, embodiments of the present invention provide a means to evaluate multiple potential network configurations. As such, different potential configurations can be compared and evaluated. Embodiments of the present invention use "distance metrics" to evaluate the network configuration. This facilitates reconfiguring of the network from a state corresponding to a poorer distance metric, to a state corresponding to a better distance metric, for example after a failure event occurs.

Embodiments of the present invention combine particular distance metrics with one or more search methods for determining potential network configurations having desirable values for such distance metrics. The search methods use the distance metrics for evaluating potential network configurations. Embodiments of the present invention are applied in the context of a satellite OAM system.

FIG. 3 illustrates an example method 300 for configuring a communication network. The method includes, at step 302, obtaining information indicative of current status of nodes of the communication network, links between the nodes of the communication network or a combination both nodes and links. The method further includes, at step 304, processing the information to determine a potential new network configuration based on the obtained information. The potential new network configuration is implementable by adjusting one or more of the nodes, one or more of the links between network nodes (where appropriate), or a combination thereof. The processing includes evaluating at least the network configuration based on a distance metric indicative of the lengths of shortest paths which interconnect the nodes of the network via the links. The method further includes, at step 306, providing instructions directing one or more underlying resources to implement the network configuration. The underlying resources can be network nodes themselves, or components of network nodes, or other equipment usable to perform network node adjustments or network configuration operations in general, whether physical, electrical or otherwise. In the case of FIGS. 2A and 2B, the underlying resources can be physical actuators (e.g. thrusters such as propellant rockets) which are capable of rotating the satellite nodes. The instructions can cause network nodes to physically reconfigure in order to implement the network configuration. The instructions can cause network nodes to adjust operations, such as communication operations, in a manner that implements the network configuration. For example, the adjusting in operations can involve adjusting which communication equipment is used to support a given link, or which communication channel or frequency is used, or which of a plurality of communication modes (e.g. radio or optical) is used, or the like. The adjustment can depend on what options are available at a node for changing aspects that can affect its operations.

In some embodiments processing the information to determine the network configuration to be implemented includes evaluating one or more candidate network configurations based on the distance metric, and selecting the network configuration to be implemented as one of the candidate network configurations having a lowest value (among all candidates) or at least a sufficiently low value of the distance metric. In some embodiments, the candidate having the lowest value of the distance metric (among some or all candidates), or substantially the lowest value of the distance metric, can be selected. The links can be optical links for example involving communication lasers. The links can be wireless links for example at radio frequency, which can include microwave frequencies.

In various embodiments two or more candidate network configurations are evaluated using a given distance metric, and these candidate network configurations are then compared to determine a most preferable network configuration, or a set of one or more preferable network configurations. For example, the candidate network configuration with the lowest value of distance metric can be most preferable. Scalar-valued distance metrics can be readily compared. Vector-valued or matrix-valued distance metrics can be compared element-wise or lexicographically, or on the basis of Pareto efficiency or Pareto optimality, or by mapping the vector or matrix values to representative scalar values which are subsequently compared.

As such, a plurality of candidate network configurations can be evaluated by determining a value of the distance metric for each. Then, from among the evaluated candidates, a more preferable network configuration can be selected based on a comparison between the determined values. For example, the candidate network configuration having a lowest value of the distance metric can be selected as the more preferable network configuration for implementation. As another example, the candidate network configuration having a lowest value of the distance metric, while also satisfying one or more other constraints, can be selected as the more preferable network configuration for implementation. The constraints can reflect any desired design or operating parameters, such as connectivity, communication cost, communication delay, network robustness, etc. As another example, the candidate network configuration having one of the lowest values of the distance metric can be selected as the more preferable network configuration for implementation. For example, for some value N, the N candidate network configurations having the relatively lowest values of the distance metric can be identified and the more preferable network configuration can be selected from among these N candidate network configurations either arbitrarily or according to some predetermined criteria. As another example, a plurality of candidate network configurations having lower than a predetermined threshold value of the distance metric can be identified, and the more preferable network configuration can be selected from among these candidate network configurations either arbitrarily or according to some predetermined criteria.

In various embodiments the current status of nodes in indicative of whether or not one or more of the nodes, or one or more of the links between nodes, is in an outage state. For greater clarity, an example of a link being in an outage state may include where one, or both, directional transceivers or link equipment instances has failed. As a result, these failed directional transceivers or link equipment may not allow a network node to communicate with either other network nodes or, for example, a ground station. An outage state could either be temporary or permanent, based on the reason for the transceiver or link equipment failure. For example, a temporary outage state could be caused by debris that has impaired the ability to communicate with other network nodes, while a permanent outage state could be caused by damaged link equipment.

In various embodiments the network includes a low-earth orbit (LEO) satellite constellation, or a plurality of LEO satellite constellations. Such a plurality of constellations may involve, for example, multiple trains of LEO satellites, where each train includes multiple satellites being spaced apart and following a same or similar orbital trajectory at a same or similar altitude.

In various embodiments the network includes a hybrid satellite constellation of LEO satellites and medium earth orbit (MEO) satellites. This may involve, for example, multiple trains of LEO satellites, where certain trains may be in communication with specific MEO satellites at different stages of an orbit.

In various embodiments the network includes a hybrid satellite constellation of LEO satellites and geostationary earth orbit (GEO) satellites. This may involve, for example, multiple trains of LEO satellites, where certain trains may be in communication with specific GEO satellites at different stages of an orbit.

Figure 4:
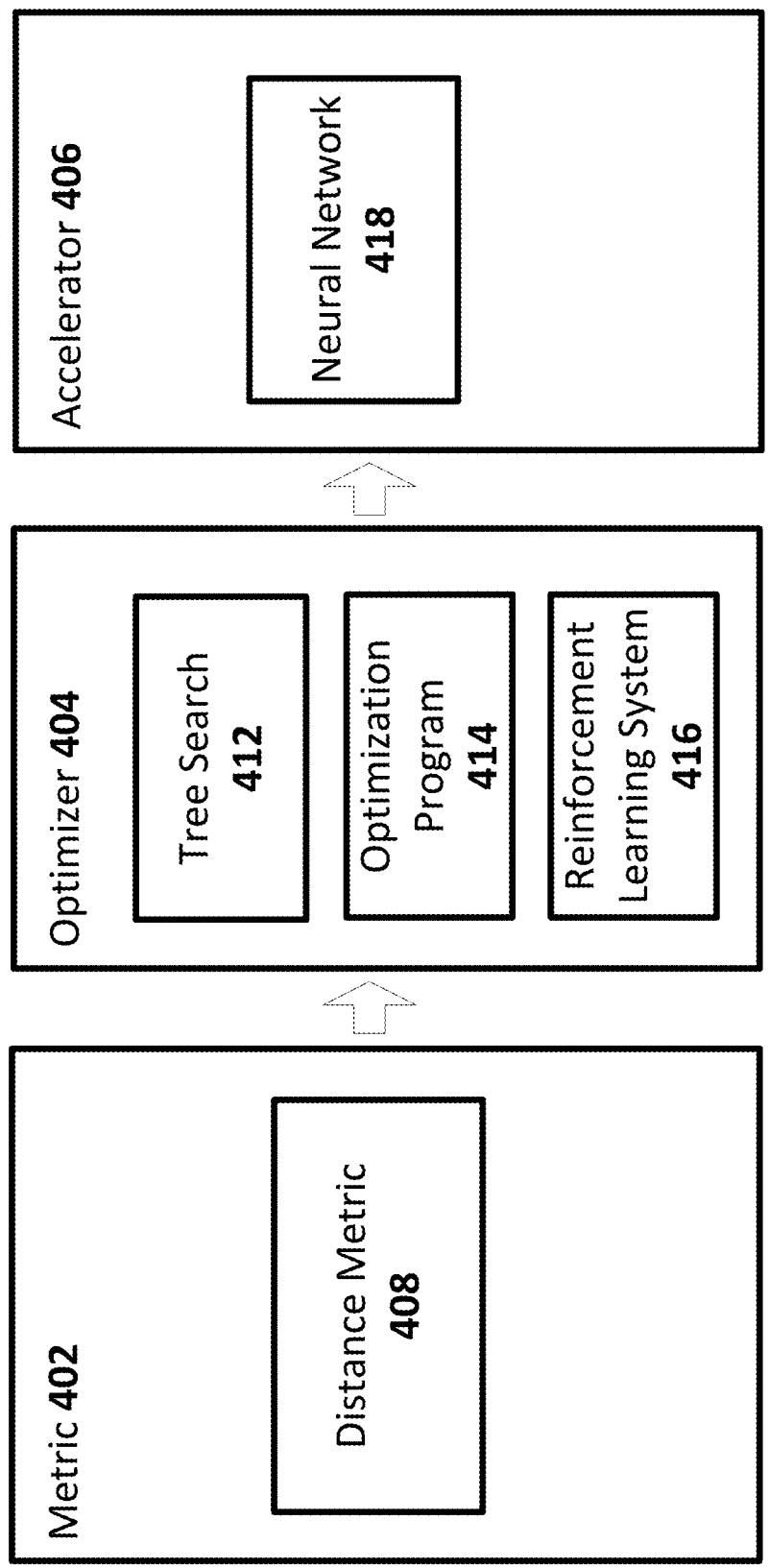
FIG. 4 illustrates a network configuration apparatus, according to an embodiment of the present invention.

FIG. 4 depicts a network configuration apparatus provided in accordance with an embodiment of the present invention. As illustrated, there are three connected elements: a metric 402, an optimizer 404 and an accelerator 406. The metric 402 quantifies the network design and may include metrics such as the distance metric 408. The optimizer 404 determines desirable network configurations by evaluating candidate configurations using the distance metric 402. The optimizer 404 may employ one or more of a variety of approaches such as but not necessarily limited to a tree search 412, an optimization program (also referred to as a solver) 414 or a reinforcement learning system 416. The optimization program or solver can be a computing system configured to perform computations in a predetermined manner in order to optimize or approximately determine a solution to a specified problem. For example, the optimization program or solver can determine a network configuration which maximizes or minimizes or substantially maximizes or minimizes an objective function, subject to constraints. The objective function (to be minimized) may be the value of a distance metric characteristic of the network as a whole (e.g. network diameter or all pairs shortest path value). The accelerator 406 improves the optimizer search time. This may be accomplished by using approaches such as a neural network 418. For example, an optimizer performing a tree search 412 may use a neural network 418 to guide the search, such that for a given state, the neural network 418 would recommend a limited set of actions to explore, relative to all actions available to the tree search.

Different systems may make use of the distance metric to respond to changes in network configuration. For example, the distance metric may be used as the objective function of an optimization program, or alternatively as a constraint function. However, this use may be problematic as the distance metrics typically do not have the properties of linearity or convexity, and thus cannot easily be handled by some conventional optimization programs such as linear programming solvers. Alternatively, the distance metric may be used as the reward function for a reinforcement learning system, such as a Q-learning system. In various other systems, the distance metric may be used to assign node values to a tree search.

Various different distance metrics can be employed which provide a numerical (e.g. scalar or vector) value indicative of the path lengths between pairs of nodes of the network, and which characterizes the network as a whole. In various embodiments, a graph theoretic approach is used to compute the distance metric. In more detail, it is considered that the network configuration is expressed as a graph G having a set of nodes (vertices) V and a set of edges E. The edges are expressed as pairs of vertices. The graph includes an edge (i,j) if and only if there exists a link between network nodes i and j. The set of nodes V and the set of edges E can be represented in a variety of ways, such as in a data structure (e.g. array, list, object, record, etc.) or in a matrix. The weight for an edge (i,j) belonging to the set E is denoted w(i,j). The weights can also be represented in a data structure or matrix. The representation of the weights can be in associated with the representation of the set of nodes V and the set of edges E. In some embodiments, the weights and the set of edges can be integrated together into the same representation. For example, a single matrix can be used to indicate both existence of edges and weights of the edges which exist. In other embodiments the weights and the set of edges can be separate.

In various embodiments, in order to evaluate a network configuration, a distance metric is applied to a graph G which represents the network configuration. That is, a numerical representation of a network configuration (e.g. a candidate network configuration) is provided as a graph G, and a distance metric for this network configuration is computed based on its numerical representation. A distance metric is a function which is applied to a graph, in order to compute a representative value for the graph. It should be noted that the distance metric does not necessarily correspond to physical distance. Rather, the distance metric may be based on the weights associated with the graph's edges.

In various embodiments, distance metrics are composed from the path distances between all pairs of vertices in the graph. The shortest path between two vertices is defined so that the total sum of the edge weights along the path is a minimum.

In more detail, and in various embodiments, given a graph G with weighted edges, the distance between two vertices can be defined as the length of a shortest path between the two vertices. As such, the term "distance" herein as it pertains to pairs of nodes can be interpreted as "shortest path distance." The length in turn corresponds to the sum of the weights of the weighted edges that make up this shortest path. In further embodiments, a distance metric is a function of distances between vertices, and which is characteristic of the graph as a whole. For example, the diameter of a graph is the maximum distance between pairs of vertices in the graph. As another example, the all pairs shortest path distance is a set of values (e.g. in matrix form) representing the set of shortest paths between all pairs of vertices in the graph. A variety of other, potentially arbitrary, distance metrics can be defined as functions of distances between vertices. For example, a distance metric can indicate the average distance between pairs of vertices in a graph, or the distance metric can indicate statistics based on the distribution of distances between pairs of vertices in the graph. The average can be an arithmetic average (e.g. mean, median, mode), or a geometric average, an output of a low-pass filter which receives and processes plural values, or another type of average of some (e.g. a majority) or all of the distances. As another example, defining the eccentricity of a vertex in a graph as the maximum distance from that vertex to any other vertex, the radius of the graph can be used as a distance metric, where the radius is the minimum eccentricity of a vertex in the graph. As yet another example, the total distance of the graph, defined as the sum of the distances between all pairs of vertices, can be used as a distance metric.

As such, the distance metric can be indicative of one of a variety of functions which is based on shortest path lengths. For example, the distance metric can be indicative of a longest one of the shortest paths, e.g. a maximum shortest path length, as is the case with network diameter. The distance metric can be indicative of a shortest one of the shortest paths, e.g. a minimum shortest path length. The distance metric can be indicative of an average length of some or all of the shortest paths, e.g. an average shortest path length. The average can be any one of a variety of types of averages. The distance metric can be indicative of a statistical distribution of the shortest path lengths. For example, the distance metric can encode an average and variance of the statistical distribution. As another example, the distance metric can be indicative of one, two or more moments describing the statistical distribution. The statistical distribution can be an observed distribution such as a histogram.

Various techniques may be used to determine the shortest path between one pair of vertices. A non-limiting list of such techniques is discussed below. Embodiments of the present invention include determining the shortest path using computation, for example, by an electronic device.

In various embodiments, the shortest path between one pair of vertices may be computed using Dijkstra's shortest path algorithm. Variants of the Dijkstra's algorithm may either find the shortest path between two given nodes, or they may use a single node as a "source" node to find the shortest paths from the source to all other nodes in the graph, thereby producing a shortest-path tree.

In various embodiments, the shortest path between one pair of vertices may be computed using the Bellman-Ford algorithm, or more generally using a dynamic programming approach. The Bellman-Ford algorithm computes shortest paths from a single source vertex to all of the other vertices in a weighted directed graph. A directed graph (or digraph) is a graph that is made up of a set of vertices connected by edges, where the edges have a direction associated with them. Weighted directed graphs (also called directed networks) are directed graphs that have weights assigned to their directions (or arrows), similarly to weighted graphs, which has weights assigned to its edges.

In various embodiments, the shortest paths can be computed using optimization programs.

In various embodiments, the shortest path between one pair of vertices may be computed using the Floyd-Warshall algorithm. The Floyd-Warshall algorithm is an algorithm for finding shortest paths in a directed weighted graph with positive or negative edge weights. It is unique in that it computes the shortest path between all pairs of vertices.

Various metrics derived from "shortest path algorithms" may be used as indicators of distance metrics. A non-limiting list of such metrics is discussed below.

In various embodiments, the network diameter may be used as an indicator for the distance metric. The network diameter is defined as the longest shortest path in the network. In other words, it is the maximum distance between any pair of nodes on the network. The network diameter is typically measured in hop counts, which may optionally be weighted.

In various embodiments, the average shortest path length may be used as an indicator for the distance metric. For example, the average shortest path length may be an arithmetic average equivalent to the sum of all the shortest paths in the graph, divided by the number of paths.

In various embodiments, the average path length may be used as an indicator for the distance metric. For example, the arithmetic average path length $l_G$ of an unweighted directed graph G having a set of vertices V is given by:

$l_G = 1/n(n-1) \cdot \Sigma d(v_i, v_j)$, where d represents the shortest distance between $v_i$ and $v_j$, both elements of V, and n is the number of vertices in G.

A potential problem may occur when a network is partitioned into components as there would be no edges between the partitions. This suggests that the value of the distance metric would become infinite, because the distance between the partitions is infinite.

As depicted, for example, in FIGS. 2A and 2B, certain links can fail. According to further embodiments, failed links, such as links 202, may be represented as high cost links. In FIGS. 2A and 2B, the failed links 202 have failed because of link equipment instances 206a and 206b. In a normal shortest path computation, the failed edges 202 would be removed. Instead, according to embodiments of the present invention, these edges are replaced by a high cost edge. That is, a high weight value is associated with such links. The high cost ensures that the edge will only be used in path computation if the network has been partitioned. The fact that the cost is finite allows the metric to distinguish between different configurations when it has been partitioned into components.

In various embodiments, the cost of a failed link is set to a value that is larger than the maximum path length in the network. An upper bound for the maximum path length can be computed by taking the sum of all the edge weights in the graph (except the failed ones).

As such, in various embodiments, a link exists in the set of edges E when there is either a communication link or a potential communication link between nodes i and j. In other words, if a communication link generally exists between two nodes, but the link is in an outage state, the graph still includes an edge corresponding to that communication link. In further embodiments, when a link is in an outage state but still represented by an edge of the graph, the weight for the associated edge (e.g. as a cost) can be set to an arbitrarily high but finite value. For example, the weight for an edge representing a link which is in an outage state can be set to a value which is larger than a maximum value that the distance metric can achieve, on an entire graph, when applied to a path consisting only of links in non-outage states. Using this approach, link outages can be treated with lower risk of partitioning the representative graph into multiple disconnected sub-graphs.

That is, when a link is in an outage state, it is still represented by an edge in the associated graph. Thus, there is less risk of partitioning the graph into multiple separate sub-graphs by removing the link. Such partitioning can be problematic because the distance metric applied to a graph consisting of multiple separate sub-graphs is often infinite, making comparison of different network configurations difficult. On the other hand, by increasing the weight value for the edge associated with a link in outage state, that link is avoided when determining shortest paths, thereby functionally removing the link from usage while also maintaining graph connectivity.

For example, a network such as a satellite network can include a set of nodes in a regularly-spaced (e.g. two-dimensional grid-like) arrangement, with potential communication links only between nodes which are adjacent in the grid. This leads to a corresponding representative graph with certain regularity conditions, namely that the graph is representable in a two-dimensional grid such that all neighboring vertices are connected by edges and no non-neighboring vertices are connected by edges. Then, links which are in an outage state can be represented by assigning large weight values to the corresponding edges.

Figure 5A:
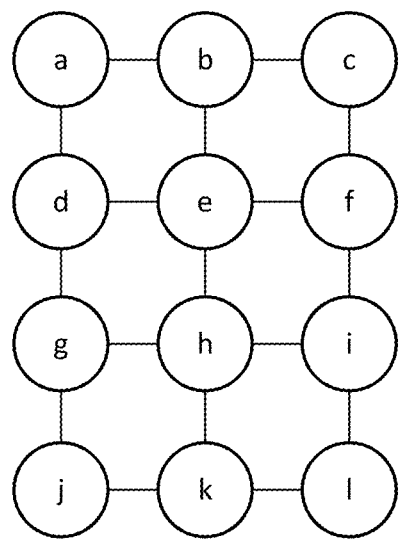
FIGS. 5A, 5B, 5C and 5D illustrate example graphs, with some having different values for a distance metric, according to an embodiment of the present invention.
Figure 5B:
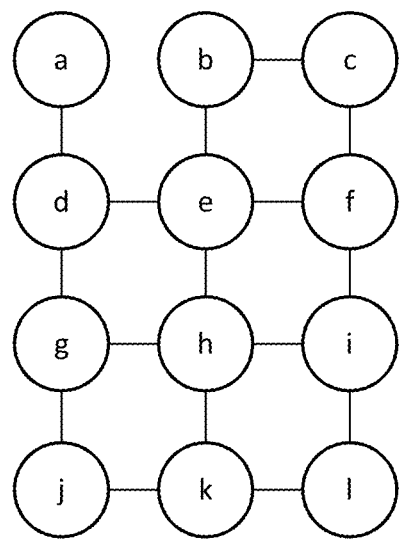
Figure 5C:
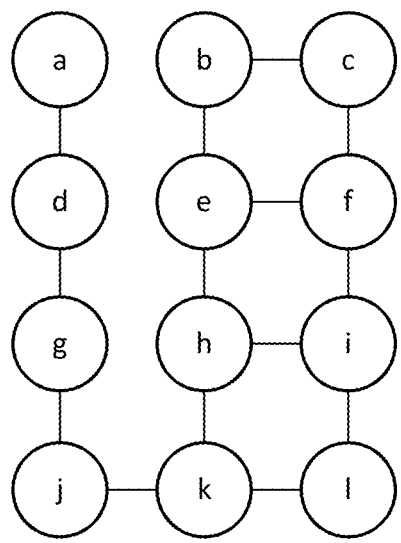

FIGS. 5A, 5B and 5C illustrate examples of how the distance metric may be indicative of the number of links between nodes and where those are links are located. In FIG. 5A, the network diameter is 5, while the all-pairs shortest path (APSP) sum is 154. In FIG. 5B, the link between nodes 'a' and 'b' is removed, resulting in a network diameter of still 5, with the APSP sum increasing to 158. In FIG. 5C, the links between nodes 'd' and 'e', and 'g' and 'h' are further removed resulting in the network diameter increasing to 8 and the APSP sum further increasing to 210.

Figure 5D:
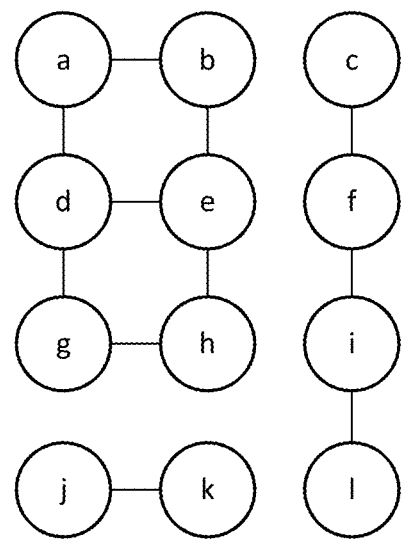

In cases of partitioned graphs, the APSP metric may not be able to distinguish between different configurations of connected graphs, as the metric is always infinite. As already mentioned above, a solution for this is setting the cost of a disconnected or failed link to a large number, instead of setting it to infinity. The large number should be $c \geq N$, where N is the number of nodes in the graph. FIG. 5D illustrates an example of a partitioned graph.

In various embodiments, the distance metric is selected based on a combination of usefulness and computability. Some distance metrics can be readily computed using graph theory or other techniques, for example. Some of these metrics are more useful, in the sense that they readily identify network configurations that are operationally useful. For example, some distance metrics return generally lower (more desirable) values for networks in which nodes are able to communicate with each other via fewer hops involving other nodes, on average. Embodiments of the present invention provide for certain general and specific forms of such distance metrics. A distance metric can be selected during system design, or the system can be configured to implement one of a plurality of distance metrics, which is either manually or automatically selectable.

In various embodiments, the reconfiguration of a satellite network (e.g. represented as a graph for evaluation purposes) is carried out via reinforcement learning and average path length as a metric. In further embodiments, this may be accomplished using, for example, Dijkstra's algorithm to obtain the shortest path between one pair of vertices, or, for example, using the Floyd-Warshall algorithm to obtain the shortest paths between all pairs of vertices.

Figure 6:
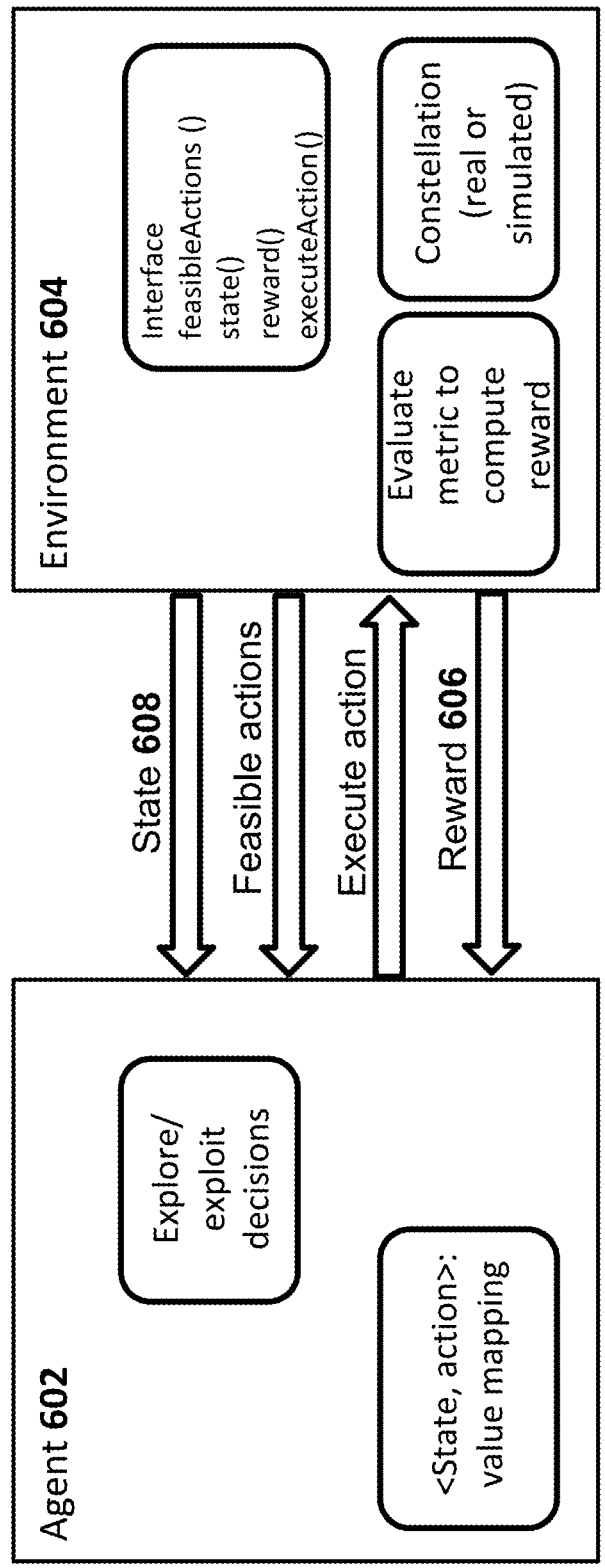
FIG. 6 illustrates an example reinforcement learning system, according to an embodiment of the present invention.

FIG. 6 depicts an example schematic of a reinforcement learning system which can be used according to embodiments of the present invention. A reinforcement learning system includes an agent 602 and the environment 604. The environment 604 has a state 608 and a set of actions which act to change the state. The environment 604 also provides the agent 602 with a reward 606. The reward 606 can be assigned based on the state 608 of the environment 604 or based on the state 608 of the environment 604 combined with an action (usually known as Q learning). The agent 602 interacts with the environment 604 to maximize the sequence of rewards 606 it receives.

The environment 604 may compute the average path length (or value of another distance metric) for its current state 608 (or of some future state 608 after taking an action) and then send it to the agent 602 as a reward 606. The agent 602 uses this reward 606 to learn which actions work well in different states in order to reconfigure the system after failures.

The agent 602 may be trained offline using a simulator that reproduces the network behavior. Alternatively, the agent 602 may be trained online, however as many thousands of scenarios are required for training, the network being managed may be in disarray until the agent 602 has learned how to effectively reconfigure the network.

Advantages of the above system include that it will learn how to reconfigure the network. The reinforcement learning system should be able to learn how to quickly reconfigure the network without expensive combinatorial searches.

Figure 7:
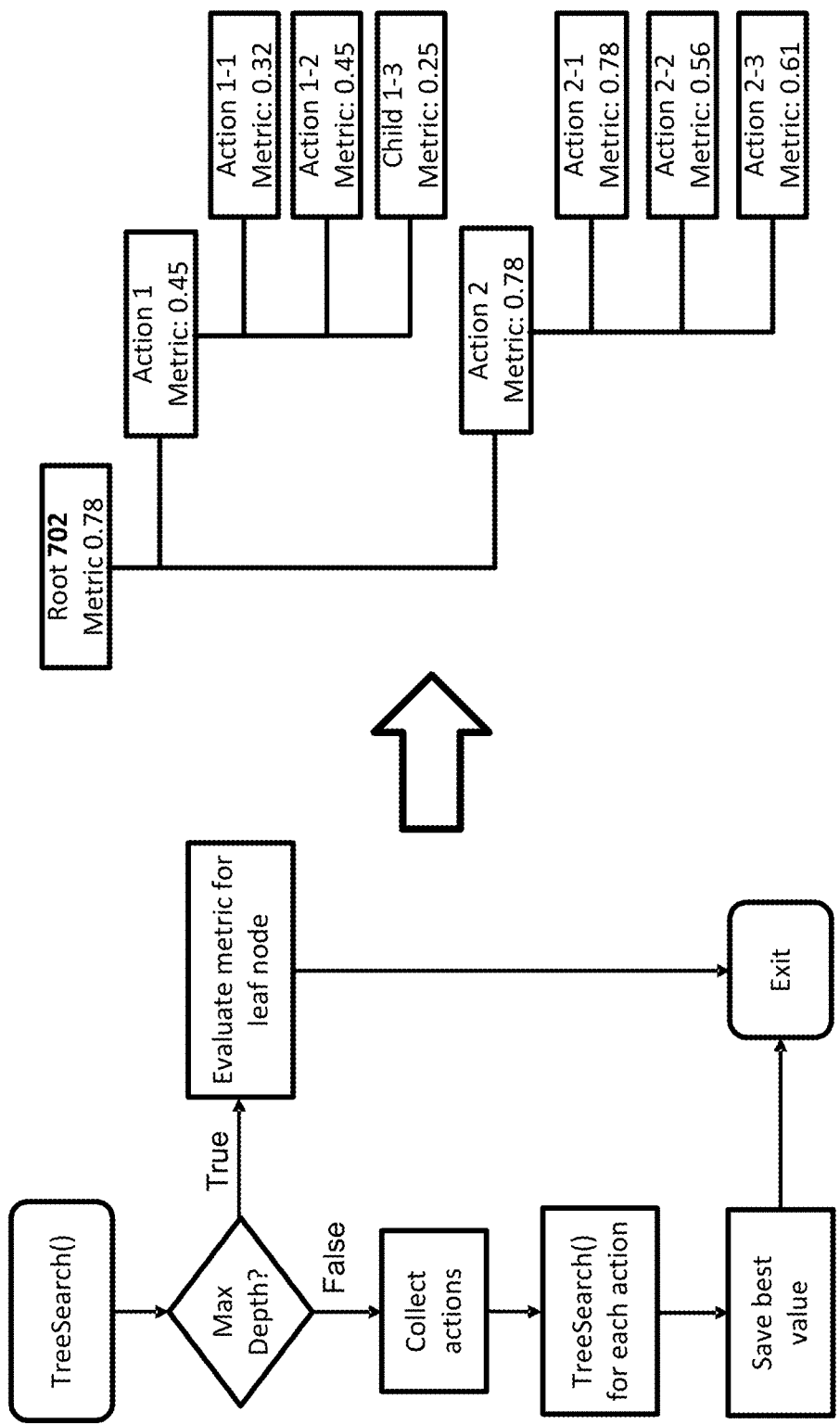
FIG. 7 illustrates an example tree search operation, according to an embodiment of the present invention.

In one embodiment, the average path length can be used with a tree search to determine the best action to take to improve the network configuration. FIG. 7 depicts an example schematic of the tree search. Each node in the tree represents a state of the network. The root 702 of the tree is the current network state. Candidate actions create new states which are added to the tree as children of the current node. The search takes place recursively, starting with the root 702 node. As the recursion unwinds, each node tracks the best metric of all its children and which action is taken to reach that child. This mechanism allows each node to store the best action to take.

Thus, processing the information to determine the network configuration may include evaluating a plurality of candidate network configurations based on the distance metric using a tree search, and selecting the network configuration and one of the candidate network configurations evaluated using the tree search and having at least a sufficiently low value of the distance metric. The tree search is performed on a tree having a root node, a plurality of branch nodes and a plurality of leaf nodes, each branch node and leaf node representing one of the candidate network configurations, and adjacent pairs of the branch nodes and leaf nodes representing candidate network configuration which differ by an incremental amount.

In some embodiments the tree search is a depth-first tree search. The tree search may be limited in depth. This may be necessary for performance reasons, as the search tree grows rapidly with increasing depth.

Alternatively, the search tree may use a neural network to guide the search. For a given state, the neural network would recommend a small set of actions to explore. The neural network may thus operate as an accelerator which is used in conjunction with the tree search to determine a network configuration to implement.

The system may use the results of the tree search in different ways. One step is to run a tree search. After the tree search is performed, the first action may be executed from the root. This would mean that a network reconfiguration corresponding to the first action from the root node would be performed. For example, the first action may be to reorient a particular network node. Once the first action is performed, then a new tree search may be run and the process described above may be repeated. These iterations would eventually stop, for example when the tree search cannot find an action to improve the network.

Another approach to using the results may be to run a tree search, after which a plurality of possible actions is executed. These actions may start from the root and proceed down to a particular leaf node. In this manner, multiple actions may be performed by a single running of the tree search. Referring to FIG. 7, actions may start at the root node 702 and then work their way down the branches, completing each action along the way. When all of the actions in a particular path from root to leaf node have been executed, a new tree search may be run and the process repeated. This method uses the same stopping criteria.

In various embodiments, tree search operations can be adjusted to avoid cycles. A cycle is where the system returns to a state it has previously been in during the same reconfiguration. It may be dangerous for a system to fall into a cycle as it may not be able to escape it. Therefore, a cycle would prevent a system from reconfiguring itself in a meaningful manner. To avoid cycles of this type, the tree search may be configured to remember the states it has already visited during the reconfiguration. These states may be viewed as constraints. These constraints may be treated as actions that are not included in the tree search because they would return the network to one of these cyclic states.

In some embodiments, the following heuristic can be implemented to improve search time. A boundary can be drawn around one or more anomalies (i.e. failed links) in the graph representation of the network. The search omits any actions that affect nodes outside of this boundary as they cannot improve the network configuration. This may be particularly important in situations where the network is being reconfigured in response to a failure, such as a link failure. This technique may provide a localized remedy for nodes that require reconfiguration, while allowing the nodes outside of the boundary to remain undisturbed.

A technical advantage of the tree search method is that it may allow the system designer direct control over the accuracy of the solution. This means that all possible actions may be evaluated (given enough time) and the best one chosen from among them. Alternatively, the search may be stopped after a sufficiently good solution has been identified, or after a certain amount of time has elapsed.

In various embodiments processing the information to determine the network configuration may include training a machine learning agent to select, from among candidate network configuration, an adequately connected network configuration. The training includes providing feedback to the machine learning agent. The feedback is based at least in part on the distance metric. The training further includes operating the machine learning agent to select the network configuration based on the information indicative of the current status of nodes of the communication network, the links between the nodes of the communication network, or a combination thereof. In some embodiments the machine learning agent may use a neural network (e.g. as an accelerator) to evaluate a state-action-value function indicative of feedback to the machine learning agent. A state-action-value function, also called a Q function, specifies how good it is for a machine learning agent to perform a particular action in a state. Therefore, the feedback from the state-action-value function may be used to determine whether the machine learning agent should take a particular action.

Figure 8:
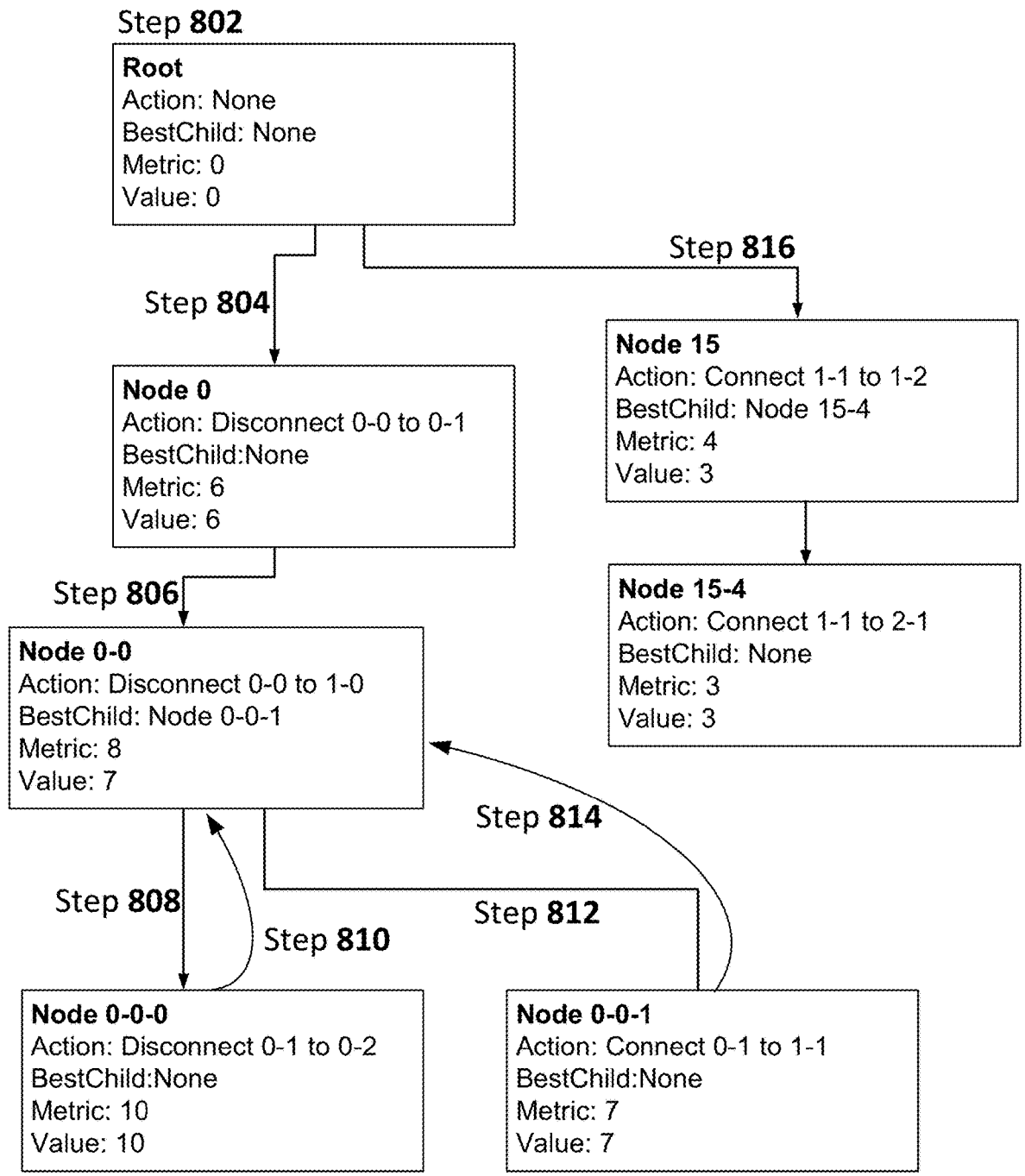
FIG. 8 illustrates an example tree search operation in greater detail, according to an embodiment of the present invention.

FIG. 8 illustrates an example tree search operation in greater detail. Tree nodes are presented in boxes. Each tree node has specific attributes including Action (the action taken to get to that node from the parent node), BestChild (the child node of that node that has the best Value), Metric (the distance metric for the state that that particular node represents) and Value (the best metric taken from all the child nodes and this node). It should be noted that if all of the child nodes have a worse metric, then Metric and Value will be equal for a node. The example distance metric used in the present case is a network diameter.

Operation of the tree search may proceed as follows. At step 802, a root node is created. At step 804, the first child node is created at level 1. The action to get to Node 0 is to disconnect the link between network node 0-0 and network node 0-1. At step 806, the first child node is created at level 2. The action to get here is to disconnect the link between network node 0-0 and network node 1-0. At step 808, the first child node is created at level 3. To get to this state, disconnect the link between network node 0-1 and network node 0-2. At step 810, the tree search is limited to depth 3, so Node 0-0-0 does not create any children. The search then moves back to Node 0-0. The Value of Node 0-0-0 is worse than the Value of Node 0-0, so Node 0-0-0 is not marked as the best child of Node 0-0. At step 812, Node 0-0-1 is created to explore the next action from Node 0-0. At step 814, the tree search is limited to depth 3, so Node 0-0-1 does not create any children. The search returns to Node 0-0, and this time, the Value of Node 0-0-1 is better than the Value of Node 0-0, resulting in Node 0-0-1 being marked as the BestChild of Node 0-0. The Value of Node 0-0 is also updated to match the Value of Node 0-0-1. The search proceeds recursively in this manner, first exploring all the children of Node 0-0, then returning to Node 0 and exploring its children. A search tree such as this may have approximately 5000 nodes in it once the search is complete. At step 816, once the tree search is completed, the best actions to take may be obtained by following the BestChild links. In the example of FIG. 8, the best child of the root node is Node 15. It should be noted that most nodes in this search have been omitted for brevity. The best child of Node 15 is Node 15-4, and since Node 15-4 does not have a best child, the two actions to be taken are: 1. Connect 1-1 to 1-2, and Connect 1-1 to 2-1. After one or more of the actions have been executed, the tree search may be repeated for a new network configuration. When the root node does not have a best child, the network configuration is the final as the tree search cannot find any improvements to be made.

Figure 9:
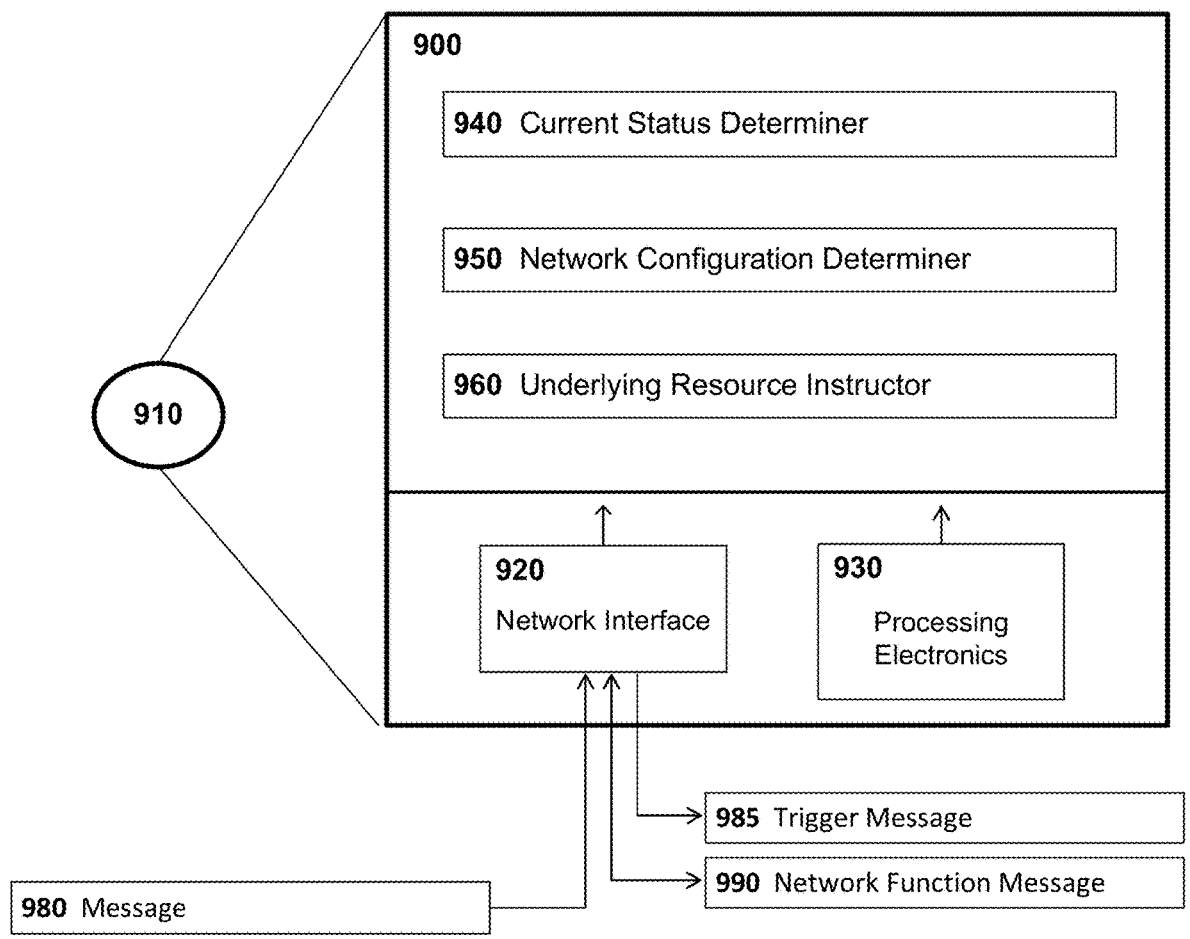
FIG. 9 illustrates an apparatus provided in accordance with an embodiment of the present invention.

FIG. 9 illustrates an apparatus 900 located in a network node 910, according to an embodiment of the present invention. The apparatus 900 includes a network interface 920 and processing electronics 930. The network interface 920 can be a single network interface or a combination of network interfaces (e.g. including a satellite-to-satellite communication interface and a satellite-to-ground communication interface). The processing electronics can include components such as computer processors, graphics processing units, memory, digital or analog circuits, or the like, or a combination thereof. The processing electronics 930 can, by executing program instructions stored in memory, be configured to implement several operations as described herein. The processing electronics may include the memory, or the memory may be separate (not shown).

Accordingly, the processing electronics can be configured to implement a current status determiner 940 which, when configured, obtains information indicative of current status of the nodes of the communication network, links between the nodes of the communication network, or a combination thereof. Information indicative of current status of nodes may be obtained via, for example, network interface 920, originating from, for example, a ground station that may be monitoring a plurality of nodes.

The processing electronics can further be configured to process the obtained information to determine a network configuration based on the obtained information. The processing electronics can be configured to provide a network configuration determiner 950 which may be configured to find a desired new configuration by computing the obtained information. The network configuration determiner 950 may compute what manner of instructions may be needed in order to achieve the new configuration The processing electronics can be configured to implement an underlying resource instructor 960 which is configured to provide instructions directing one or more underlying resources to implement the network configuration. The underlying resource instructor 960 may be configured to adjust one of more of the nodes, one or more of the links between nodes, or a combination thereof. The processing of the obtained information includes evaluating at least the network configuration based on a distance metric indicative of lengths of shortest paths which interconnect nodes of the network via the links.

The current status determiner 940, the network configuration determiner 950, and the underlying resource instructor 960 can be configured to reconfigure multiple nodes of the communication network, multiple links between the nodes of the communication network, or a combination thereof.

In terms of messaging, and in some but not necessarily all embodiments, the apparatus 900 can receive, transmit, or both receive and transmit, via the network interface, various messages 980. The apparatus can also transmit trigger messages 985 to other nodes, for causing the other nodes in relation to a reconfiguration process. Trigger messages may thereby be used to reconfigure multiple nodes. The apparatus can also transmit and receive network function messages 990, which are messages communicated in accordance with an operation of the network itself. The apparatus can also transmit node location advertisement messages (not shown) indicative of current or future node location. Advertisements of location can be used in support of determining locations of network nodes.

Figure 10:
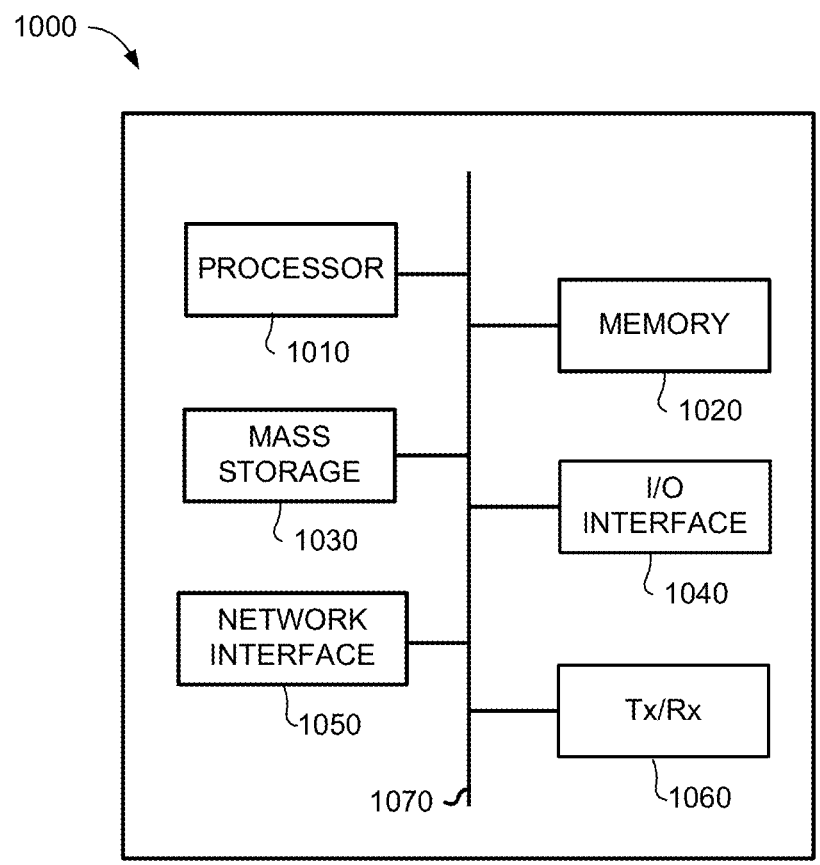
FIG. 10 illustrates an apparatus provided in accordance with another embodiment of the present invention.

FIG. 10 is a schematic diagram of an electronic device 1000 that may perform any or all of operations of the above methods and features explicitly or implicitly described herein, according to different embodiments of the present invention. For example, a computer equipped with network function may be configured as electronic device 1000.

As shown, the device includes a processor 1010, such as a Central Processing Unit (CPU) or specialized processors such as a Graphics Processing Unit (GPU) or other such processor unit, memory 1020, non-transitory mass storage 1030, I/O interface 1040, network interface 1050, and a transceiver 1060, all of which are communicatively coupled via bi-directional bus 1070. According to certain embodiments, any or all of the depicted elements may be utilized, or only a subset of the elements. Further, the device 1000 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 1020 may include any type of non'-transitory memory such as static random access memory (SRAM), dynamic random access memory (DRAM), synchronous DRAM (SDRAM), read-only memory (ROM), any combination of such, or the like. The mass storage element 1030 may include any type of non-transitory storage device, such as a solid state drive, hard disk drive, a magnetic disk drive, an optical disk drive, USB drive, or any computer program product configured to store data and machine executable program code. According to certain embodiments, the memory 1020 or mass storage 1030 may have recorded thereon statements and instructions executable by the processor 1010 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for configuring a communication network, the method comprising:
    obtaining information indicative of current status of nodes of the communication network, links between said nodes of the communication network, or a combination thereof;
    processing the information to determine a network configuration, the network configuration implementable in the communication network by adjusting one or more of said nodes, one or more of said links between said nodes, or a combination thereof, wherein said processing comprises evaluating a plurality of candidate network configurations, including the network configuration, based on a distance metric indicative of lengths of shortest paths which interconnect nodes of the communication network via said links, the distance metric representative of the network configuration as a whole; and
    providing instructions directing one or more underlying resources to implement the network configuration,
    wherein said evaluating the plurality of candidate network configurations comprises determining a value of the distance metric for each respective one of the plurality of candidate network configurations, and wherein the determining the network configuration comprises selecting the network configuration from among the plurality of candidate network configurations based at least in part on a comparison between the determined values of the distance metric.

2. The method of claim 1, wherein the communication network is a satellite network.

3. The method of claim 2, wherein the satellite network comprises a low-earth orbit (LEO) satellite constellation, a plurality of LEO satellite constellations, a hybrid satellite constellation comprising LEO satellites and medium earth orbit (MEO) satellites, or a satellite constellation comprising LEO satellites and geostationary earth orbit (GEO) satellites.

4. The method of claim 1, wherein said current status is indicative of whether or not one or more of said nodes or one or more of said links is in an outage state.

5. The method of claim 1, wherein said processing the information to determine the network configuration further comprises performing an optimization routine having an objective which is based on the distance metric.

6. The method of claim 1, wherein the selecting the network configuration based at least in part on the comparison comprises one of: selecting, as the network configuration, one of the plurality of candidate network configurations having a lowest value of the distance metric; selecting, as the network configuration, one of the plurality of candidate network configurations having a lowest value of the distance metric and satisfying one or more other predetermined conditions; and selecting, as the network configuration, one of the plurality of candidate network configurations having one of the lowest values of the distance metric.

7. The method of claim 1, wherein the distance metric is indicative of one or more of: a longest one of the shortest paths; a shortest one of the shortest paths; an average length of some or all of the shortest paths; and one or more indications of a statistical distribution of the shortest paths.

8. The method of claim 1, wherein the distance metric is indicative of one or more of: a network diameter, a maximum shortest path length; a minimum shortest path length; an average shortest path length; and an all-pairs shortest path length.

9. The method of claim 1, wherein said lengths of shortest paths are determined using a shortest path computation performed according to at least one of: an optimization program; a Dijkstra's shortest path algorithm; a Bellman-Ford algorithm; and a Floyd-Warshall algorithm.

10. The method of claim 1, wherein processing the information to determine the network configuration comprises:
training a machine learning agent to select, from among candidate network configurations, a network configuration having an adequately low value for the distance metric, said training comprising providing feedback to the machine learning agent, wherein the feedback is based at least in part on the distance metric;
operating the machine learning agent to select the network configuration based on the information indicative of the current status of nodes of the communication network, the links between said nodes of the communication network, or the combination thereof.

11. The method of claim 10, wherein the machine learning agent uses a neural network to evaluate a state action value function indicative of said feedback to the machine learning agent.

12. The method of claim 1, wherein the network configuration comprises configuring one or more nodes.

13. The method of claim 1, wherein the network configuration comprises physically reorienting one or more of said nodes to reorient one or more directional transceivers thereof, said reorienting of directional transceivers affecting one or more of said links between said nodes.

14. A method for configuring a communication network, the method comprising:
obtaining information indicative of current status of nodes of the communication network, links between said nodes of the communication network, or a combination thereof;
processing the information to determine a network configuration, the network configuration implementable in the communication network by adjusting one or more of said nodes, one or more of said links between said nodes, or a combination thereof, wherein said processing comprises evaluating a plurality of candidate network configurations based on a distance metric indicative of lengths of shortest paths which interconnect nodes of the communication network via said links, the distance metric representative of the network configuration as a whole; and
providing instructions directing one or more underlying resources to implement the network configuration,
wherein the evaluating the plurality of candidate network configurations is based on the distance metric using a tree search,
wherein the tree search is performed on a tree having a root node, a plurality of branch nodes and a plurality of leaf nodes, each branch node and leaf node representing one of the plurality of candidate network configurations, and adjacent pairs of the branch nodes and leaf nodes representing candidate network configurations which differ by an incremental amount; and
wherein the determined network configuration is a selected one of the plurality of candidate network configurations having a sufficiently low value for said distance metric.

15. The method of claim 14, wherein the tree search is a depth-first tree search.

16. The method of claim 14, wherein the selected one of the plurality of candidate network configurations is selected on a basis of having a lowest value for said distance metric among all of the plurality of candidate network configurations.

17. A device comprising:
a network interface;
a processor; and
a non-transient computer readable memory having stored instructions which when executed by the processor configure the device to:
obtain information indicative of current status of nodes of the communication network, links between said nodes of the communication network, or a combination thereof;
process the information to determine a network configuration, the network configuration implementable in the communication network by adjusting one or more of said nodes, one or more of said links between said nodes, or a combination thereof, wherein said processing comprises evaluating a plurality of candidate network configurations, including the network configuration, based on a distance metric indicative of lengths of shortest paths which interconnect said nodes of the communication network via said links, the distance metric representative of the network configuration as a whole; and
provide instructions directing one or more underlying resources to implement the network configuration,
wherein said evaluating the plurality of candidate network configurations comprises determining a value of the distance metric for each respective one of the plurality of candidate network configurations, and
wherein the determining the network configuration comprises selecting the network configuration from among the plurality of candidate network configurations based at least in part on a comparison between the determined values of the distance metric.

18. The device of claim 17, wherein said processing the information to determine the network configuration further comprises performing an optimization routine having an objective which is based on the distance metric.

19. The device of claim 17, wherein to process the information to determine the network configuration comprises to:
    train a machine learning agent to select, from among candidate network configurations, an adequately connected network configuration, said training comprising providing feedback to the machine learning agent, wherein the feedback is based at least in part on the distance metric;
    operate the machine learning agent to select the network configuration based on the information indicative of the current status of nodes of the communication network, the links between said nodes of the communication network, or the combination thereof.

20. A device comprising: a network interface;
    a processor; and
    a non-transient computer readable memory having stored instructions which when executed by the processor configure the device to:
    obtain information indicative of current status of nodes of the communication network, links between said nodes of the communication network, or a combination thereof;
    process the information to determine a network configuration, the network configuration implementable in the communication network by adjusting one or more of said nodes, one or more of said links between said nodes, or a combination thereof, wherein said processing comprises evaluating a plurality of candidate network configurations based on a distance metric indicative of lengths of shortest paths which interconnect said nodes of the communication network via said links, the distance metric representative of the network configuration as a whole; and
    provide instructions directing one or more underlying resources to implement the network configuration,
    wherein said evaluating the plurality of candidate network configurations is based on the distance metric using a tree search,
    wherein the tree search is performed on a tree having a root node, a plurality of branch nodes and a plurality of leaf nodes, each branch node and leaf node representing one of the plurality of candidate network configurations, and adjacent pairs of the branch nodes and leaf nodes representing candidate network configurations which differ by an incremental amount; and
    wherein the determined network configuration is a selected one of the plurality of candidate network configurations having a sufficiently low value for said distance metric.

\* \* \* \* \*